United States Patent [19]
Morse

[11] 3,748,916
[45] July 31, 1973

[54] CHAIN SHIFTING MEANS FOR DERAILLEUR SPEED CHANGING DEVICES

[76] Inventor: Milton Morse, 1 Horizon Rd., Fort Lee, N.J.

[22] Filed: June 3, 1971

[21] Appl. No.: 149,537

[52] U.S. Cl............................ 74/217 B, 74/242.15 B
[51] Int. Cl.................................................. F16h 9/24
[58] Field of Search.................. 74/217 B, 242.15 B, 74/242.4; 280/236, 238, 261, 287

[56] References Cited
UNITED STATES PATENTS

| | | | |
|---|---|---|---|
| 3,661,021 | 5/1972 | Oshita | 74/217 B |
| 3,364,762 | 1/1968 | Maeda | 74/217 B |
| 3,181,383 | 5/1965 | Juy | 74/217 B |
| 3,259,398 | 7/1966 | Hattan | 280/236 |

Primary Examiner—Leonard H. Gerin
Assistant Examiner—Frank H. McKenzie, Jr.
Attorney—Charles E. Temko

[57] ABSTRACT

An improved derailleur mechanism for use with bicycles having a choice of five speeds in increments such that the torque ratio varies approximately 1.5 to 1 with each increment. The smallest driven sprocket on the rear wheel hub has only nine teeth, so that the largest may have only 45 teeth. During the period in which the 9 tooth sprocket is engaged by the sprocket chain, the guide idler sprocket is positioned close to the periphery thereof so that there is insufficient room to permit the chain to skip over the teeth with the transmission of power through the chain. The chain is shifted from a smaller sprocket to a sprocket of larger diameter by a "pinch" effect in which the pitch circle of the guide idler sprocket is pressed in tangential relation with the sprocket upon which the chain is shifted, so that a segment of the same is constrained to ride over the teeth of said sprocket and be quickly engaged thereon. The derailleur cage is mounted on the bicycle at an empirically determined pivot point such that the pitch circle of the guide idler sprocket will always enter into selective tengential relation with each of the five driven sprockets. In embodiments employing sprockets of irregular progression, it is possible to modify the path of the guide idler sprocket by varying the location and length of the trunnions which support the cage. Under certain conditions, a trunnion length of 0.9 inches will provide sufficient radial displacement for a progression of 13 to 24 teeth to obtain a torque ratio of almost 2 to 1. A chain jack is provided on the frame of the bicycle to disengage the driven chain from the sprockets for easy removal of the rear wheel. This jack may also be used to determine the amount of length of chain on initial installation. The derailleur is also provided with a transverse axis rocking adjustment to compensate for slight discrepancies in the length of the driven chain.

10 Claims, 10 Drawing Figures

CHAIN SHIFTING MEANS FOR DERAILLEUR SPEED CHANGING DEVICES

This invention relates generally to the field of derailleur speed changing devices suitable for use on bicycles having a speed changing means, and more particularly to an improved simplified arrangement of derailleur shifting means and related driven sprockets. Mention is made of my co-pending application, Ser. No. 851,812, filed Aug. 21, 1969 now Pat. No. 3,581,249 granted June 8, 1971, under the same title, which discloses and claims a related invention.

BACKGROUND OF THE INVENTION

Since the invention of the so-called "safety" bicycle, in which power is transmitted to the rear wheel through a crank having a sprocket mounted on a hanger beneath the rider to a driven sprocket on the rear wheel, attempts have been made to facilitate the transmission of power from the rider to enable him to climb reasonable grades without the necessity of dismounting. The simpliest of such devices comprises a rear hub having planetary gears therein which are selectively lockable under the control of the rider, and which give a total spread from the lowest to the highest (numerical) gear of approximately 1.7 to 1. A more sophisticated device is the five speed hub in which sprockets of varying numbers of teeth are arranged on one side of the hub with means to shift the driving sprocket chain from one sprocket to another under the influence of a derailleur mechanism, such devices offering a total spread from the lowest to the highest sprocket of approximately 2.7 to 1. A further refinement incorporates the provision of two coaxial driving sprockets at the hanger, and separate derailleur shifting means therefor in conjunction with the five sprocket hub to give a total of 10 speeds. Here, the total spread in gear ratios ranges to approximately 3.2 to 1. A still further refinement incorporates three sprockets at the hanger which further improves the spread, at the expense of extreme complication requiring shifting skills normally beyond the abilities of most riders.

Actually, the ideal spread of gear ratios is not in the order of 3 to 1, but rather 5 to 1. This range permits high speed cruising on level terrain with relatively little effort, while providing ample mechanical advantage for ascending substantial grades. Further, large numbers of individual speeds offered by 10 and 15 speed devices are not offered so much as a useful convenience for the rider, but are dictated by the necessity of overcoming the difficulty of shifting between sprockets in which the difference of teeth is anywhere near that required to make a useful transition. Normally, a desired shift should be accomplished where the amount of effort becomes approximately one and one-half times that required for comfortably maintaining a constant number of pedal revolutions per minute. Since most 10 and 15 speed bikes provide several increments between this ratio, individual shifts often require the transfer of the chain to more than one sprocket before the desired ratio is obtained.

It is therefore among the principal objects of the present invention to provide an improved derailleur type shifting mechanism, in which the necessity of overshooting while changing sprockets, either to a higher or a lower numerical ratio is completely eliminated, thereby permitting shifting to be accomplished by means of an indexing control mechanism, similar to that used in the controlling of planetary type speed change mechanisms.

Another object of the invention lies in the provision of an improved derailleur speed changing device, in which a ratio spread of approximately 5 to 1 is provided, utilizing only five sprockets on the driven rear wheel hub, and with a complete elimination of the necessity of chain shifting from sprocket to sprocket at the crank hanger.

Another object of the invention lies in the provision of an improved derailleur mechanism, in which the idler sprockets are so configured and positioned that the chain is continuously fed directly from the same to the desired driven sprocket, rather than merely guided thereupon, thereby substantially eliminating the possibilities of chain slippage during shift, and permitting shifting under substantial load.

Yet another object of the invention lies in the provision of an improved derailleur mechanism, in which the control means, normally in the form of a cable may be precisely positioned at a predetermined position corresponding to a selected gear ratio, without the necessity of first moving the control means past such position until a shift is completed, and subsequently returning the same to the predetermined position.

These objects, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIG. 1 is a schematic view of an embodiment of the invention, showing the entrainment of the driving chain upon the smallest of 5 driven sprockets on the rear wheel hub. Note that while the chain pays off from the guide idler 19 onto the smallest sprocket 11, the pitch circle of the guide idler 19 is tangent with next largest sprocket 12.

FIG. 2 is a similar schematic view, showing the entrainment of the chain on the second of the sprockets. Note that while the chain pays off from the guide idler onto sprocket 12, the pitch circle of the guide idler 19 is tangent with the next larger sprocket 13.

FIG. 3 is a similar view showing the entrainment of the chain on the fourth, next to largest, sprocket 14. Note that as the chain pays off from the guide idler 19 onto sprocket 14, the pitch circle of guide idler 14 is tangent with the pitch circle of largest sprocket 15.

FIG. 4 is a similar view showing the entrainment of the chain on the fifth or largest sprocket.

FIG. 5 is a schematic view. FIGS. 1 and 5 are related in the following manner: In FIG. 1, the drive chain would pay off from the guide idler 19 onto the smallest sprocket 11. However, due to the action of the trunnions, the pivot point 21 has moved from the dot-dash position to point 22. This has the effect of lengthening the chain, and therefore the cage 17A shifts clockwise to position 17B, and the guide idler 19A has now shifted to position 19B as indicated by the full lines on FIG. 5.

FIG. 6 is a schematic view. FIGS. 4 and 6 are related as follows: In FIG. 4 the drive chain would pay off from the guide idler 19A onto the largest sprocket 15. However, due to the action of the trunnions, the pivot point 21 has moved from the dot-dash position to point 22. Consequently the idler cage 17A shifts clockwise to position 17B and the guide idler 19A moves to the full line position at 19B.

BRIEF DESCRIPTION OF THE DISCLOSED EMBODIMENTS

Figure 1:
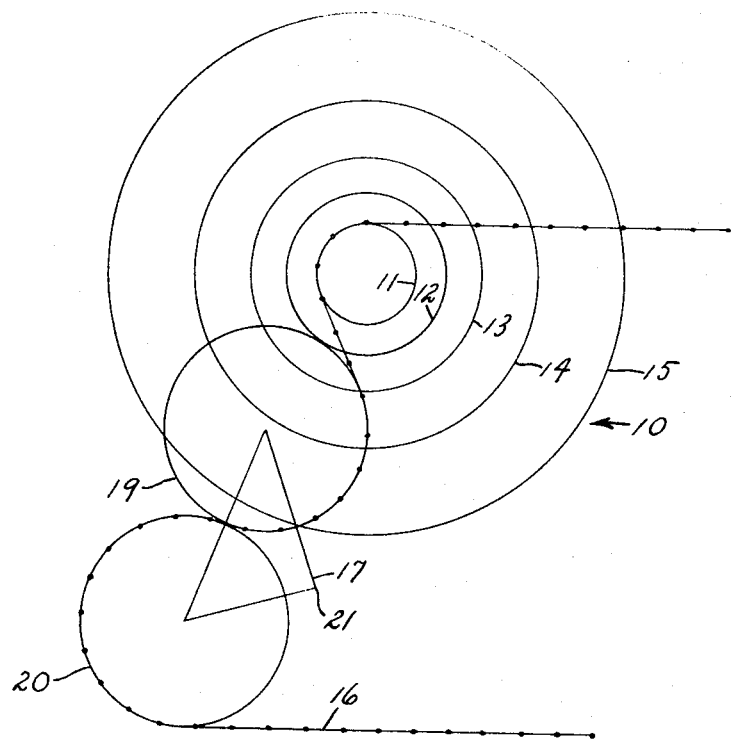
Figure 2:
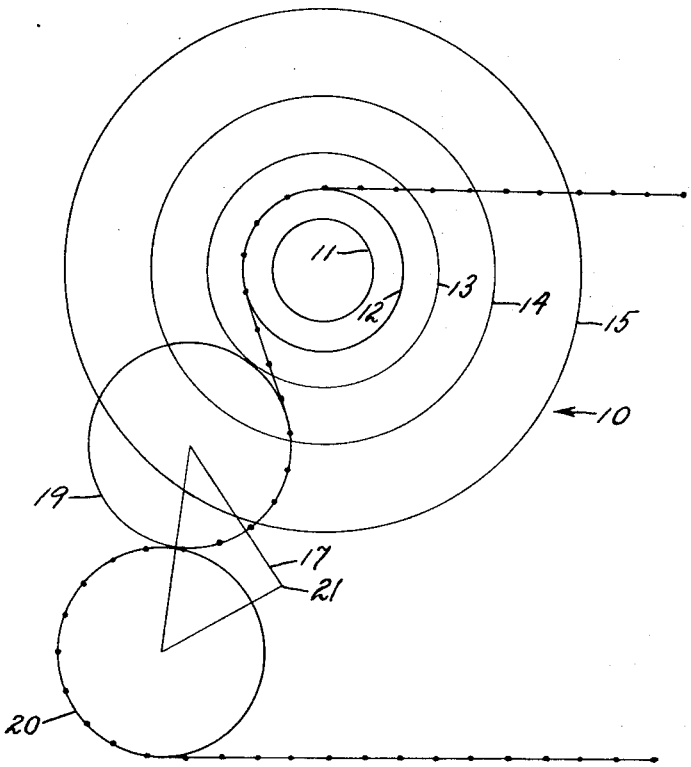
Figure 3:
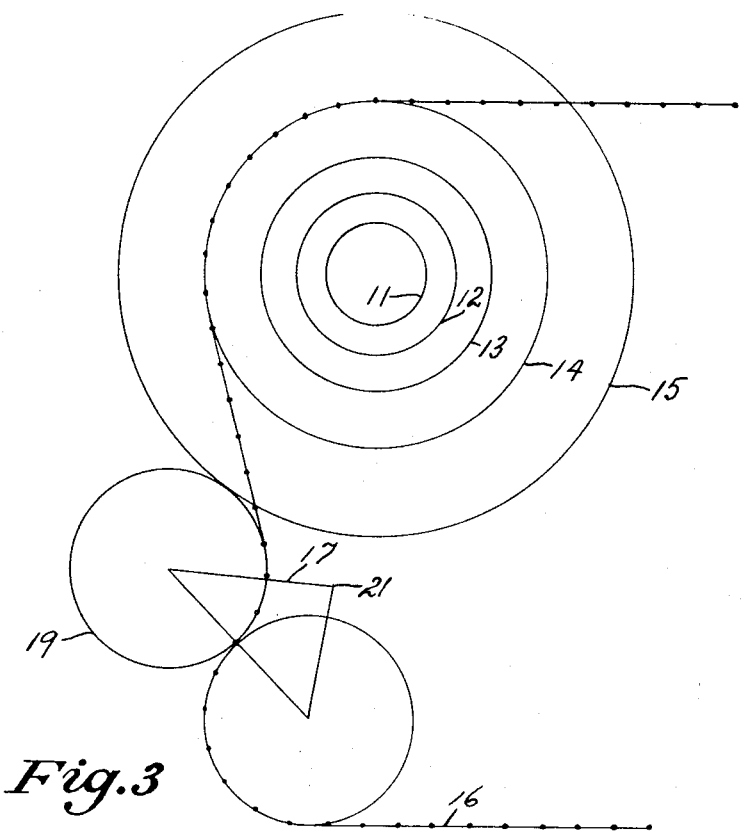

Briefly stated, the invetion contemplates providing five driven sprockets on the rear wheel hub of the cycle to provide a total torque ratio range of 5 to 1 in substantially equal increments of approximately 1.5 to 1 with each shift to a higher (numerical) ratio. By virtue of the improved shifting action obtained, the smallest sprocket (highest numerical ratio) may contain as few as nine teeth, thus permitting the remaining sprockets to have 14, 20, 30 and 45 teeth, respectively. The pivot point of the derailleur cage is determined so that the pitch circle of the guide idler will always be tangent with the pitch circle of the next larger sprocket to which the drive chain will next be guided, as illustrated in FIGS. 1, 2 and 3.

DETAILED DESCRIPTION OF THE DISCLOSED EMBODIMENTS

Figures 9, 10:
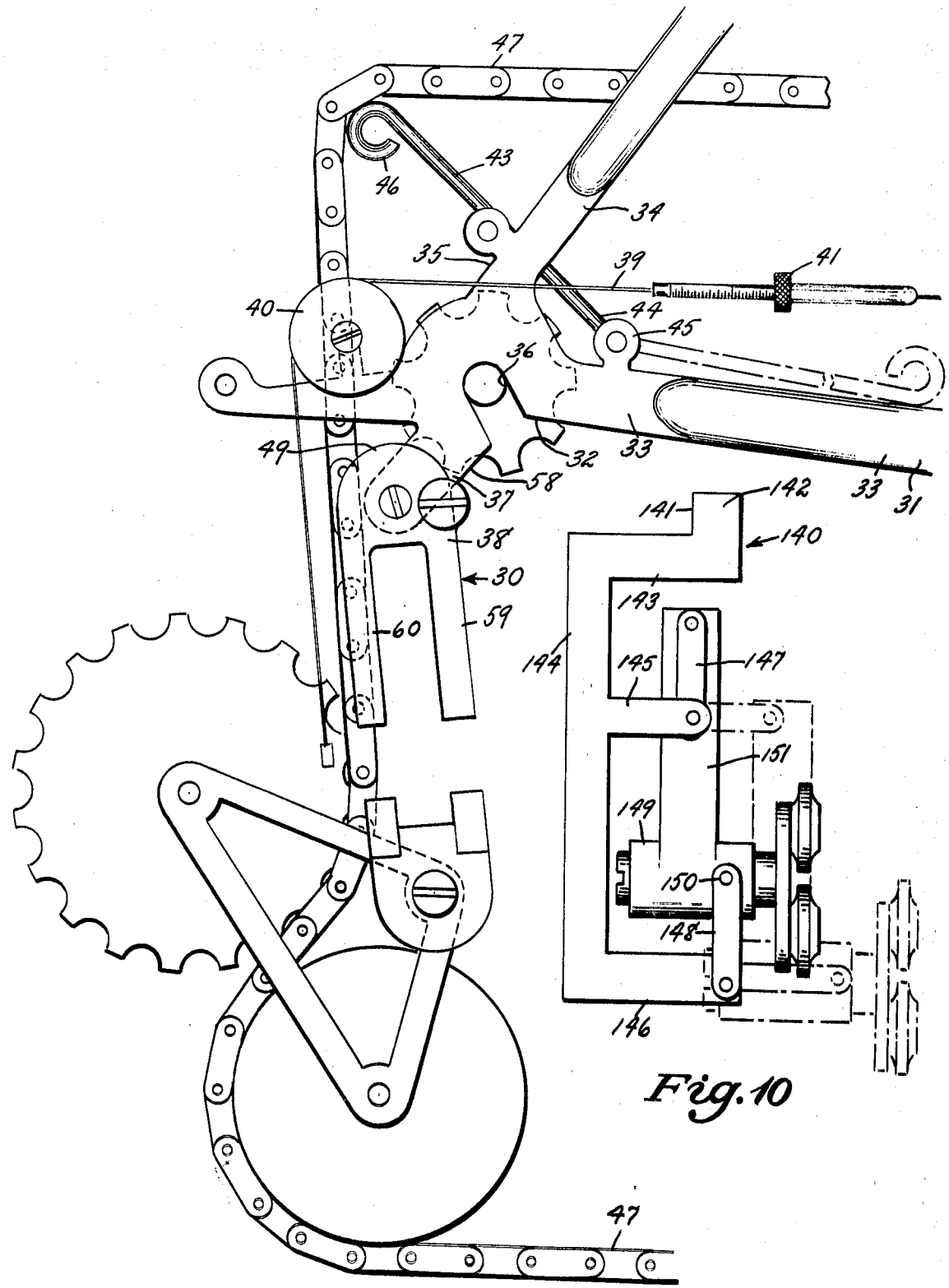
FIG. 9 is a fragmentary side elevational view of a bicycle showing the structure of FIGS. 7 and 8 mounted on the frame thereof.
FIG. 10 is a schematic side elevational view of an alternate form of derailleur mechanism.

Referring to FIG. 9 of the drawings, the device, generally indicated by reference character 30, is illustrated in installed condition upon a conventional bicycle frame 31, having a rear fork 32 formed by the interconnection of horizontal frame members 33 and inclined members 34 interconnected at 35 to provide a notch 36 for engagement of the wheel hub axle. A downwardly extending member 37 supports a derailleur mechanism 30 described in greater detail hereinbelow. The derailleur mechanism is controlled by a cable 39 extending over a pulley 40 to a length adjustment means 41 and a selector quadrant (not shown) of well known type. Pivotally mounted on the horizontal frame member 33 is an elongated jack 43, a first end 44 being supported in a trunnion 45, and a second free end 46 being curved to selectively engage a portion of the sprocket chain 47 when in the position shown in FIG. 9.

In FIG. 9, the chain is shifted by the derailleur mechanism 30, which includes a fixed mounting member 49 interconnected by first and second trunnion members 50 and 51, (FIGS. 7 and 8) respectively. Depending from the trunnion members 50–51 is a pivot block 52.

In FIG. 9, the upper portion of the mounting member 49 is provided with a bore 53 accommodating a mounting screw 54, whereby limited pivotal adjustment is possible, and a second bore 55 having a rocking screw 56, the nonciruler terminal 57 (FIG. 8) of which engages an edge 58 (FIG. 9) of the bicycle frame to provide critical adjustment. Bifurcated members 59 and 60 support a spring pin 61 engaging the upper end 62 of a tension spring 63. The bifurcated members 59 and 60 each terminate in first and second lower ends 64 and 65, respectively, having aligned bores 66 and 67 penetrated by axles mounting the trunnion members 50 and 51.

Figure 7:
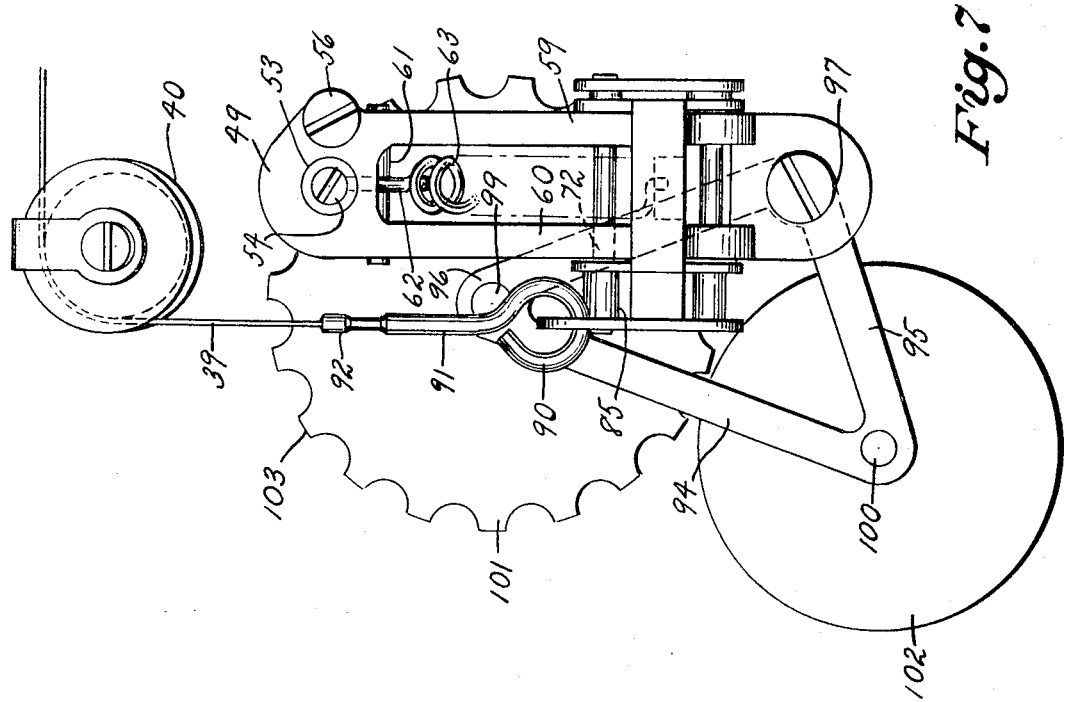
FIG. 7 is an end elevational view of a derailleur mechanism embodying the invention.
Figure 8:
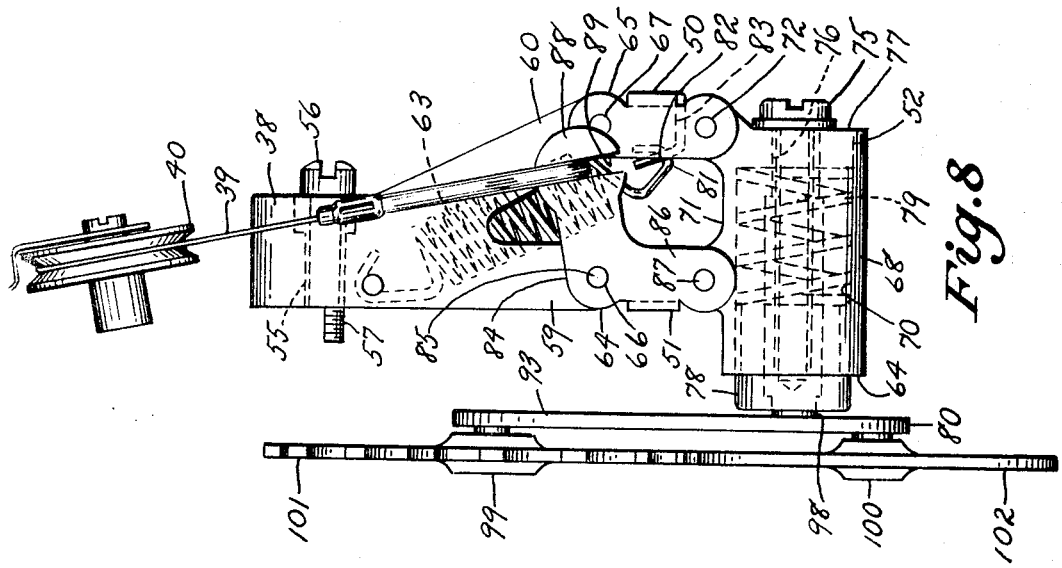
FIG. 8 is a side elevational view of FIG. 7 as seen from the left thereof.

The pivot block 52 includes a generally cylindrically shaped housing 68, having a first end surface 69 surrounding an axially aligned bore 70. The upper surface 71 of the pivot block 52 is provided with mounting lugs engaged by pintles 72 and 87. An adjustment screw 75 penetrates a bore 76 extending from the surface 77, and engages a pivot bearing 78 to shift the leftward-rightward relative location of the same with respect to the pivot block 52. A torque spring 79 interconnects the pivot block with the bearing 78, to urge the cage 80 in a clockwise direction as seen in FIG. 7, in a manner known in the art. The lower end 81 of the spring 63 engages an eye 82 in a bracket 83 on the trunnion member 50. In FIG. 8, it will be observed that the spring 63 is positioned such that movement of the pivot block 52 in a rightward-upward arcuate path does not distend the spring appreciably beyond the degree of distention shown, so that the tension maintained on the pivot block and hence the control cable is substantially constant through its path of motion, this action permitting a more accurate positioning of the pivot block. Motion along the cable 39 is transmitted by the rider through a bell crank 84 mounted on axle 85. The lower arm 86 thereof is connected to a pintle 87, while the upper arm 88, on the free end thereof is provided with a slot 89 accommodating the looped end 90 of a cable terminal member 91, the upper end 92 of which engages the lowermost end of the cable 39.

The cage 80 generally resembles that disclosed in my above mentioned co-pending application, and includes an inner frame member 93. The inner frame member 93 includes first, second, and third elongated member 94, 95, and 96, respectively, the dimensions of which are determined empirically, as discussed hereinbelow. The members are interconnected at a first point 97 to form an axis for rotation of the cage on a shaft 98, and first and second parallel shafts 99 and 100 at the other points of interconnection.

Supported on the shafts 99 and 100 are a guide idler sprocket 101 and a take-up idler wheel 102, the former of which is provided with stub teeth 103 which extend only to the pitch circle thereof.

THEORY OF OPERATION

Figure 5:
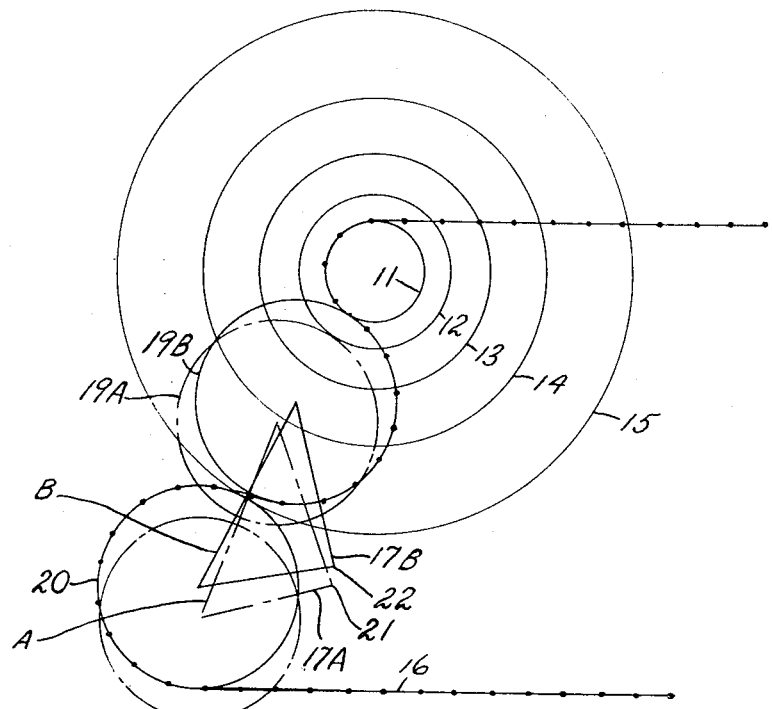
Figure 6:
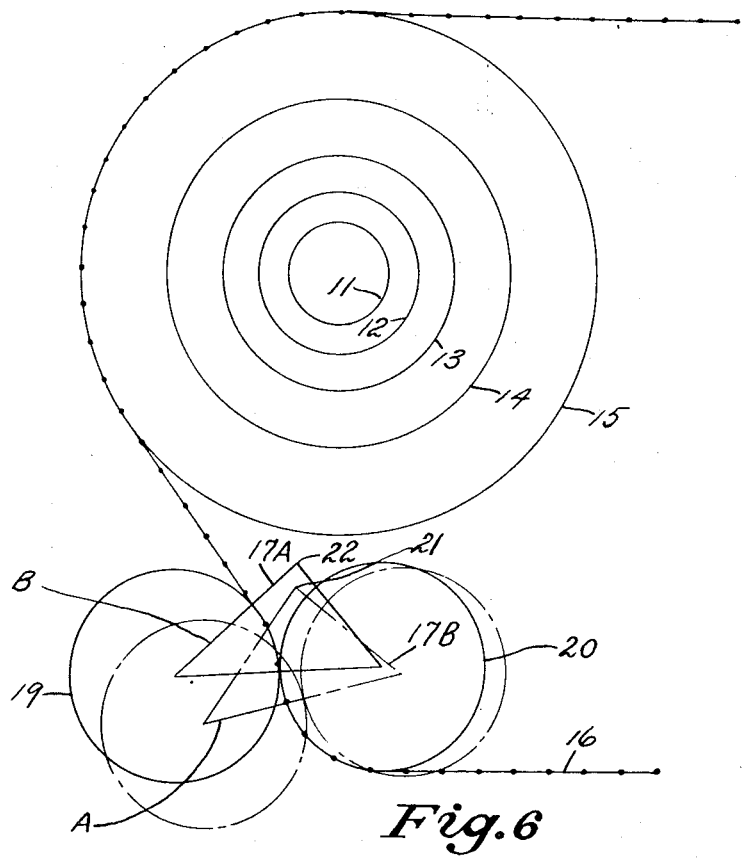

As has been mentioned, shifting is accomplished in a positive, indexed fashion, with a total absence of overshoot usually associated with derailleur mechanisms. Such positive indexed shifting was heretofor associated only with the Sturmey Archer planetary hub. As in all derailleur mechanisms, the shift must be progressive, including a shift to each intermediate sprocket, and the guide idler must not only shift laterally, but be able to position itself to achieve the pinching action described in my above mentioned co-pending application. The cage not only takes up the slack in the chain as the shift is accomplished, but also places the pitch circle of the guide idler in a tangential location relative to the next larger sprocket, as illustrated in FIGS. 1, 2 and 3. While vertical adjustment is available from the rotation of the guide idler about the axis of the cage, additional vertical adjustment may be provided by vertically displacing the pivot axis of the cage itself. This may be accomplished by the relative length of the trunnion arms. The normal center to center distance of adjacent sprockets in conventional derailleur hubs is approximately 0.225 inches, and this lateral displacement is usually accomplished in such mechanism by using relatively long trunnion arms which accomplish the total lateral displacement while moving through an angular displacement of less than 30°. By contrast, in the instant device, the trunnion arms are preferably in the order of less than 1 inch in length, and in shifting from first to fifth position, a total angular deflection of approximately 60° is obtained, resulting in vertical deflection of the pivot axis of the cage of approximately 0.150 inches, this vertical displacement being added to the vertical displacement of the guide idler sprocket obtained by cage rotation as described above in connection with FIGS. 5 and 6.

Figure 4:
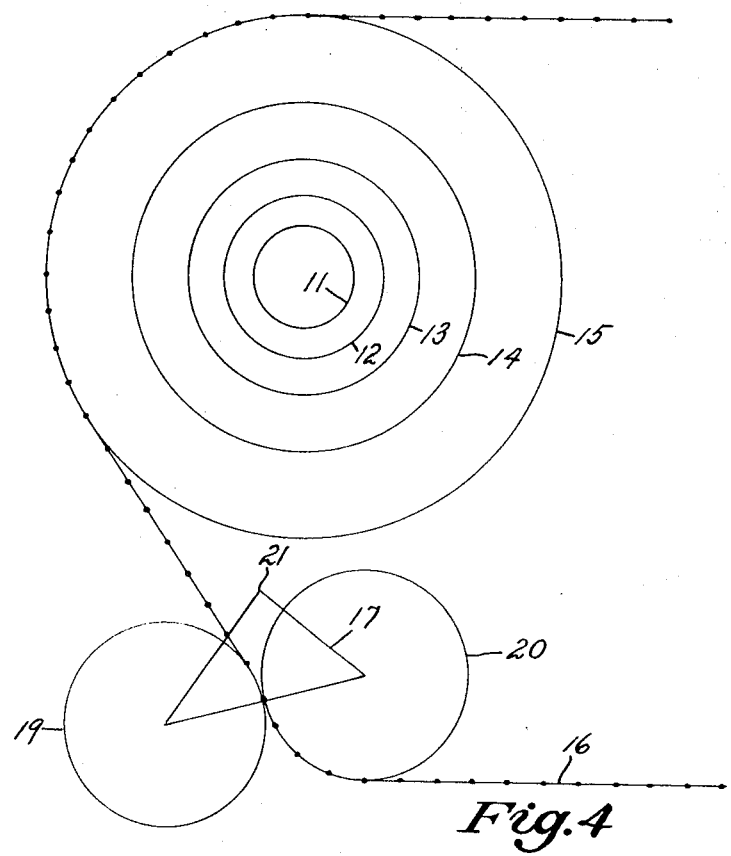

The sum of the number of teeth on the guide idler sprocket and the equivalent number of teeth on the take-up wheel, is not arbitrary, and the formula for determining the correct number can be derived by appreciating the function of the cage. The position in which the smallest driven sprocket is engaged requires maximum chain shortening. At this time, the cage will be rotated clockwise to a point where the idler sprockets will be disposed beneath each other. In this position (FIG. 1), the chain will engage approximately 180° of each of the idler sprockets. By contrast, when the largest sprocket is engaged, as shown in FIG. 4, contact of the chain with the idler sprockets is essentially tangential. Thus, the sum of the number of teeth in the guide idler and the take-up idler is equal to the difference in the number of teeth between the largest sprocket and the smallest sprocket. In the preferred embodiment, the smallest sprocket has nine teeth, and the largest sprocket 45 teeth. The difference is 36 teeth, the sum of the teeth on the idler sprockets. In the case of the take-up idler, the teeth extend only to the base circle thereof, which constitutes the equivalent of the entire teeth. By spacing the distances between the axis of the idler sprockets such that the pitch circles of each are practically tangent, minimum clearance is allowed for the chain therebetween. This arrangement has the added advantage of providing complete guidance of the chain through the cage at all times, irrespective of the angular disposition thereof. This action is illustrated in FIGS. 1 through 4, inclusive.

As might be expected, the length of chain must be precisely determined to assure proper operation. Since most sprocket chains are made up of first and second complementary links, it is not usually possible to remove individual links from a chain, and they are therefore removed or added in pairs, so that the segments may be joined to form a continuous length. Adjustments of less than the effective length of a single pair of links is accomplished by tilting the derailleur mechanism about an axis parallel to the axis of the driven hub, by use of the rocking screw 56. (See FIG. 9)

Turning to the alternate form of derailleur construction illustrated in FIG. 10 in the drawing, this construction is particularly useful where a progression of 13 to 24 teeth is contemplated, (using 5 sprockets). The pivot point of the cage moves vertically while the cage moves transversely to accomplish the desired shifting. The derailleur structure, generally indicated by reference character 140, includes a main body 141, the upper end 142 of which is mounted on the frame of the cycle in a normal manner. A horizontal offset 143 supports a vertical member 144 in turn supporting horizontal pivot members 145 and 146 upon which trunnion arms 147 and 148 are mounted. As indicated by the dashed lines in FIG. 10, the trunnion arms are capable of a full 90° pivotal movement. The pivot block 149 has one pivot point 150 directly on the body thereof, and a vertical extension 151 provides the upper pivot point. Since the trunnions are approximately 0.9 inches in effective length, the entire length of the trunnions can be used for vertical and lateral displacement of the pivot point of the cage.

Referring now to FIGS. 1 to 6, inclusive, the section of the derailleur mechanism in shifting the chain may be schematically illustrated. The cluster of sprockets, generally indicated by reference character 10, includes a first sprocket 11 of 9 teeth, a second sprocket 12 of 14 teeth, a third sprocket 13 of 20 teeth, a fourth sprocket 14 of 30 teeth, and a fifth sprocket 15 of 45 teeth. The chain 16 passes through the derailleur mechanism. The guide idler sprocket 19, and take-up idler roller 20 are sized in accordance with the above described method of computation, which may be summarized generally by the formula: $TL - TS = IT + IG$, where $TL$ is the number of teeth on the largest sprocket, $TS$ is the number of teeth on the smallest sprocket, $IT$ is the number of teeth on the take-up idler and $IG$ is the number of teeth on the guide idler. As has been mentioned, the teeth on the guide idler are preferably stub teeth extending only to the pitch circle, and in the case of the take-up idler, the teeth need extend only to the base circle, since they do not serve a guiding function, and therefore they play no direct part in the pinch effect.

Referring to FIG. 1, the cage is in position preparatory to shifting the chain from the smallest sprocket to the next larger sprocket. In this position, the guide idler sprocket is placed such that its pitch circle is tangent to the pitch circle of the next larger sprocket, and the chain is pinched therebetween. This pinching effect causes a segment of the chain to remain at the pitch circle of the next larger sprocket, so that a relatively light pressure will cause the chain to climb up onto said next larger sprocket. FIG. 3 illustrates a similar shift, in this case from sprocket 14 to sprocket 15, and in a similar manner, the guide idler sprocket is placed such that its pitch circle is tangent to the pitch circle of sprocket 15, which again makes use of my pinch effect in order to facilitate the shift of the chain onto sprocket 15 (See FIG. 4).

See FIGS. 1, 2, 3 and 4. It will be observed that although lateral movement of the cage with each shift takes place in substantially equal increments of approximately 0.225 inches, which represents the center line distance between adjacent sprockets, the radial movement of the guide idler sprocket in moving from a smaller driven sprocket to a larger one is exponential in nature, and is a function of the chain shortening effect of the rotation of the cage.

ADJUSTMENT OF THE DERAILLEUR MECHANISM

1. Install derailleur mechanism as shown in FIG. 9.
2. Estimate chain length and install it (without the rear wheel in place).
3. Raise chain jack.
4. Rock derailleur to bring the cage to the proper angle.
   a. Add or subtract links if necessary.
   b. Readjust (rock) derailleur as required.

5. Place the control lever in position 3.

6. Adjust cable length to get trunnions into vertical position.

7. Place control lever in position 5.

8. Install rear wheel and lower the chain jack.

9. The chain should drop right on to the smallest sprocket (sprocket 11).

10. (Refer to FIG. 8) Adjust screw 75 to align idler with sprocket 13.

11. If the chain does not drop freely on to sprocket 11, then the lateral adjustment screw 75 (FIG. 8) should be rotated until the guide idler 101 is properly aligned with sprocket 11.

I wish it to be understood that I do not consider the invention limited to the precise details of structure shown and set forth in this specification, for obvious modifications will occur to those skilled in the art to which the invention pertains.

I claim:

1. In the combination of a chain driven wheel hub having a plurality of sprockets of predetermined torque ratio coaxially mounted on said hub, said sprockets being spaced substantially uniformly laterally along the axis of said hub, and having radii of progressively larger dimension as a predetermined exponential function, and a derailleur mechanism for shifting a driving chain to engage a selected sprocket, the improvement comprising: said derailleur mechanism having a pivotally mounted cage, a guide idler sprocket carried by said cage having a laterally extending axis of rotation, and a control means connected to said cage for simultaneously imparting lateral displacement in fixed increments corresponding to the spacing of said sprockets on said hub, and, resulting in corresponding radial displacement as an exponential function corresponding to said predetermined exponential function, that when said driving chain is shifted from a numerically smaller sprocket to the next numerically larger sprocket said guide idler sprocket comes into substantial tangency with said numerically larger sprocket so that the chain will be pinched between the guide idler sprocket and said next larger sprocket to assist in guiding it onto to said next larger sprocket.

2. Structure in accordance with claim 1, in which said guide idler sprocket carried by said cage has an axis of rotation in spaced parallel relation relative to said pivot axis of said cage, and exponential displacement thereof is accomplished at least partially by the pivoting of said cage on its pivot axis.

3. Structure in accordance with claim 1, in which said control means includes a trunnion mechanism.

4. Structure in accordance with claim 1, further characterized in said plurality of sprockets being 5 in number, and having a ratio of teeth per sprocket between the largest and smallest sprockets of 5 to 1.

5. Structure in accordance with claim 4, in which the number of teeth on each larger sprocket is a multiple of 1.5 times the next smallest sprocket.

6. Structure in accordance with claim 1, in which the total number of teeth on the guide idler sprocket, and a take-up idler wheel on said cage is equivalent to the difference between the number of teeth on the largest sprocket and the smallest sprocket of said plurality of sprockets.

7. Structure in accordance with claim 1, in which the derailleur means includes trunnions of length 0.9 inch, and the sprockets range between 13 and 23 teeth.

8. Structure in accordance with claim 6, in which the pitch circles of the guide idler sprocket and take up idler wheel are tangent to each other, so that the chain never leaves contact with either the guide idler sprocket or take up idler.

9. Structure in accordance with claim 1, in which the derailleur mechanism is positioned substantially under and rearwardly of the rear axle, thus permitting a shorter cycle wheel base without danger of hitting the derailleur body by the heel of the right shoe of the wearer.

10. In a combination chain driven wheel hub, having a plurality of sprockets, and derailleur shifting means for shifting a driving chain to a selected sprocket, the improvement comprising: at least one of said plurality of sprockets having less than 13 teeth, a cage having a guide idler sprocket constantly entraining said driving chain, said guide idler sprocket, when positioned to engage said chain on said last mentioned one of said sprockets serving to effectively prevent said chain from skipping over the teeth of said one of said sprockets as power is transmitted through said chain.

* * * * *